United States Patent [19]
Ueba et al.

[11] Patent Number: 4,505,543
[45] Date of Patent: Mar. 19, 1985

[54] PLASTIC OPTICAL FIBERS

[75] Inventors: Yoshinobu Ueba; Shinichi Miyake, both of Osaka, Japan

[73] Assignee: Sumitomo Electric Industries, Ltd., Osaka, Japan

[21] Appl. No.: 434,286

[22] Filed: Oct. 14, 1982

[30] Foreign Application Priority Data

Oct. 14, 1981 [JP] Japan .................. 56-164597

[51] Int. Cl.$^3$ .............................. G02B 5/14
[52] U.S. Cl. .............................. 350/96.34
[58] Field of Search .............. 264/1.5; 350/96.34

[56] References Cited

U.S. PATENT DOCUMENTS

| | | | |
|---|---|---|---|
| 3,930,103 | 12/1975 | Chimura et al. | 350/96.34 X |
| 3,993,834 | 11/1976 | Chimura et al. | 350/96.34 X |
| 3,999,834 | 12/1976 | Ohtomo et al. | 350/96.34 |
| 4,138,194 | 2/1979 | Beasley et al. | 350/96.30 |
| 4,161,500 | 7/1979 | Schleinitz et al. | 264/1.5 |
| 4,381,269 | 4/1983 | Kaino et al. | 264/1.5 |

*Primary Examiner*—William L. Sikes
*Assistant Examiner*—Frank González
*Attorney, Agent, or Firm*—Sughrue, Mion, Zinn, Macpeak and Seas

[57] ABSTRACT

A plastic optical fiber comprising a core of a copolymer of an alkyl methacrylate and a styrene derivative and a cladding of a copolymer of vinylidene fluoride and a perfluoroolefin provided on the core, the copolymer of the cladding having a melting point of at least 120° C. and a perfluoroolefin content in the range of from 3 mol % to 70 mol %.

9 Claims, No Drawings ise the possi-
PLASTIC OPTICAL FIBERS

FIELD OF THE INVENTION

The present invention relates to a plastic optical fiber comprising a core and a cladding having good heat-resistance and low transmission loss.

BACKGROUND OF THE INVENTION

Conventional optical fibers are fabricated from quartz glass and plastics. Optical fibers produced from quartz glass have a high ability to transmit light without loss and are currently used for long-distance communications. Plastic optical fibers are not as high as quartz optical fibers in their ability to transmit light, but because of their high flexibility, light weight and good processability, their application in short-distance communication light guides or sensors is being studied.

Some applications of plastic optical fibers require high heat-resistance. For example, optical fibers used in an automobile optical data link system must withstand the heat from an engine compartment that often has a temperature as high as 100° to 120° C. However, most conventional plastic optical fibers comprises a core of polystyrene as disclosed in Japanese Patent Publication No. 47695/77 or polymethyl methacrylate as disclosed in British Patent 1,037,498 and U.S. Pat. Nos. 3,993,834, 3,930,103 and 4,161,500 and, therefore, their maximum use temperature limit is as low as about 80° C. At temperatures higher than above 80° C., these optical fibers shrink and their ability to transmit light decreases, and at even higher temperatures, i.e., 100° C. or more, these optical fibers further shrink and may break to make light transmission impossible.

In order to minimize such thermal shrinkage during use, plastic fibers are sometimes previously subjected to heat treatment. This heat treatment is effective in reducing the heat shrinkage of the fibers, but the fibers themselves are no longer flexible and easily break due to vibration or bending.

The present inventors have conducted research to eliminate these defects of conventional plastic optical fibers and noted that the glass transition point and melting point are important physical properties that indicate the performance of polymethyl methacrylate (used as the core) and a fluorine-containing polymer (cladding) at high temperatures. Polymethyl methacrylate used as a core material has a glass transition point of about 105° C. Studies on the relationship between temperature and heat shrinkage of a fiber comprising a core of polymethyl methacrylate show that at temperatures lower than 105° C. the fiber shrinks only slightly, whereas at temperatures higher than 105° C. the fiber shrinks in a very short period of time. For example, at 120° C. the shrink ratio is more than 30%. The major cause of shrinkage of the fiber is the heat relaxation of the polymethyl methacrylate molecules that have been oriented by a stretching effected during or after spinning to provide the plastic optical fiber with flexibility and bending properties. Stretching is essential to provide flexibility and bending properties to fibers of non-crystalline polymers, such as polymethyl methacrylate and polystyrene, and fibers having practicably usable mechanical characteristics cannot be produced without this step. As earlier described, it is possible to heat-set virgin fiber to relax the orientation of the fiber and eliminate the possibility of thermal shrinkage during use, but this impairs the flexibility and bending properties of the fiber.

An alternative method to produce a fiber that will not shrink at temperatures higher than 100° C. is to use a core made of a polymer having a high glass transition point. There are many monomers that are known to provide polymers having high glass transition points and they include styrene derivatives and methacrylate ester derivatives. However, fibers using a core of addition polymers prepared from these monomers have low flexibility and bending properties, and none of them is suitable for practical use.

Condensation polymers are also known to provide high glass transition points, and polycarbonates are condensation polymers that have high transparency and a glass transition point of about 145° C., as disclosed in Japanese Patent Publication No. 43388/76.

Fibers fabricated using a polycarbonate as a core have good thermal characteristics but their ability to transmit light without loss is much lower than fibers of polystyrene or polymethyl methacrylate. This is probably because a polycarbonate produced by condensation polymerization must be free of NaCl and other by-products but it is unavoidable that such impurities remain in or enter the product.

Other non-crystalline condensation polymers which have high glass transition points are polysulfones and polyacryl esters, but high temperatures are necessary to process them into fibers, but polymer decomposition or the presence of impurities is unavoidable and transparent fibers cannot be prepared.

The cladding of a plastic optical fiber is produced from a material having a lower refractive index than the core material. The cladding of conventional plastic optical fibers comprising a polymethacrylate core is produced from a fluoroalkyl methacrylate polymer as disclosed in Japanese Patent Publication No. 8978/68 or a copolymer of vinylidene fluoride and tetrafluoroethylene with a vinylidene fluorine content of, e.g., 77 mol%, as disclosed in Japanese Patent Publication No. 21660/78. However, fluoroalkyl methacrylate polymers start to decompose at low temperature, which is not desired in fiber making, and their glass transition point is in the low temperature range of from 60° to 90° C. Therefore, if a fiber comprising a cladding of a fluoroalkyl methacrylate polymer is subjected to a temperature close to its glass transition point, the transmission loss gradually increases and at temperatures higher than 100° C., the loss is so great that the fiber is no longer usable. A copolymer of vinylidene fluoride and tetrafluoroethylene with a vinylidene fluoride content of 77 mol% has a melting point of 110° C., and, therefore, if a fiber comprising a cladding of such copolymer is subjected to a temperature close to or beyond its melting point, the transmission loss is increased, and, eventually, the cladding will be fluidized to result in a great loss in the transmission characteristics.

SUMMARY OF THE INVENTION

On the basis of the above findings, the present inventors conducted various studies on plastic optical fibers comprising a methacrylate ester copolymer core and a fluorine-containing polymer cladding, and reached the present invention.

This invention relates to a plastic optical fiber comprising a core of a copolymer of an alkyl methacrylate and a styrene derivative and a cladding of a copolymer of vinylidene fluoride and a perfluoroolefin provided on the core. More specifically, the copolymer of the cladding has a melting point of at least 120° C. and a perfluoroolefin content of in the range of from 3 mol% to 70 mol%.

DETAILED DESCRIPTION OF THE INVENTION

The copolymer used as a core comprises an alkyl methacrylate of the formula:

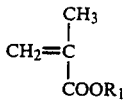

wherein $R_1$ is an alkyl group having 1 to 10 carbon atoms, for example, $-CH_3$, $-C_2H_5$, $-C_3H_7$, $-C_4H_9$,

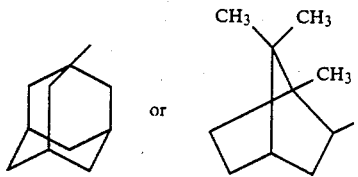

and a styrene derivative of the formula:

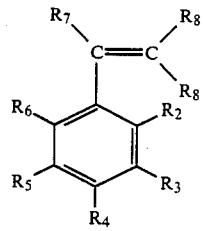

wherein $R_4$ is selected from the group consisting of a phenyl group, a tert-butyl group, a cyano group and an iodine atom and $R_2$, $R_3$, $R_5$, $R_6$, $R_7$, $R_8$ and $R_9$ are all hydrogen; or $R_7$, $R_8$ and $R_9$ are all fluorine atoms and $R_2$, $R_3$, $R_4$, $R_5$ and $R_6$ are all hydrogen; or $R_2$, $R_3$, $R_4$, $R_5$ and $R_6$ are all fluorine atoms and $R_7$, $R_8$ and $R_9$ are all hydrogen; or $R_2$, $R_3$, $R_4$, $R_5$, $R_6$, $R_7$, $R_8$ and $R_9$ are all fluorine atoms.

A preferred alkyl methacrylate is methyl methacrylate, and a preferred styrene derivative is 4-phenylstyrene or 4-tert-butylstyrene.

The plastic optical fiber of the present invention has high flexibility and bending properties and can be used without shrinkage at temperatures higher than 100° C., which is not to be expected from conventional optical fibers comprising a core of polymethyl methacrylate or polystyrene. In addition to these high thermal and mechanical properties, the fiber of the present invention is equal to or better than conventional products in its ability to transmit light without transmission loss.

The core of the plastic optical fiber of the present invention is produced from a copolymer of an alkyl methacrylate and a styrene derivative.

Generally, when monomers ($M_1$ and $M_2$) are copolymerized, the resulting copolymer has different polymer structures (e.g. random copolymer, block copolymer or alternating copolymer) depending on the monomer reactivities $r_1$ and $r_2$. A variation in the composition of the copolymer, such as in a block copolymer, is undesirable since it causes a variation in density or microphase separation which cause light scattering and hence impair light transmission characteristics.

To eliminate any deleterious effect on light transmission characteristics, the copolymer used in the present invention is produced by bulk polymerization as disclosed in U.S. Pat. No. 4,161,500 and a polymer preform directly produced by polymerizing all monomer feeds to a polymerization degree of substantially 100% (i.e., at least about 95%) is spun into a fiber through a ram extruder.

Generally, when two monomers are copolymerized by bulk polymerization at a polymerization degree of substantially 100%, different copolymer compositions are produced depending not only upon the ratio of the reactivity of the monomers and the ratio of the monomer feeds but also upon the degree of polymerization, as well known in the art. The difference in the composition of the copolymer results in a variation in polymer density and causes the light scattering. Therefore, a copolymer produced simply by copolymerizing an alkyl methacrylate with another vinyl monomer other than aryl methacrylates (i.e., a monomer that provides a polymer having a higher glass transition point than polymethyl methacrylate, e.g., acrylonitrile, vinyl chloride, etc.) cannot be processed into an optical fiber having low transmission loss and high heat-resistance contemplated per the present invention.

As a result of various experiments to produce copolymers from methacrylate ester derivatives and styrene derivatives, the present inventors found that a copolymer of an alkyl methacrylate and a styrene derivative is effective for use as a core in a plastic optical fiber and that the relative amounts of the comonomers can vary over a wide range without impairing the transmission characteristics of the resulting fiber.

The relative amounts of the comonomers, alkyl methacrylate and styrene derivative, (hereunder sometimes referred to as the ratio of the monomer feeds) may be of any value. As the relative content of the styrene derivative is increased, the resulting fiber becomes more resistant to thermal shrinkage, but its flexibility and bending properties are slightly impaired. If the relative content of the alkyl methacrylate is increased, the resistance of the resulting fiber against thermal shrinkage is somewhat reduced but, on the other hand, it has better flexibility and bending properties. A preferred molar ratio of styrene derivative in the monomer feeds is from 3 to 80%, more preferably 5 to 60%. It is to be understood that the monomer feeds ratio does not necessarily correspond to the monomer ratio in the resulting copolymer.

Examples of alkyl methacrylates are alkyl esters of methacrylic acid having 1 to 10 carbon atoms in the alkyl ester moiety such as methyl, ethyl, propyl,

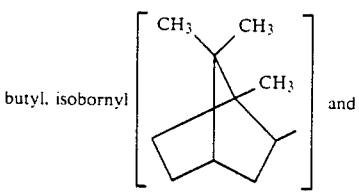

butyl, isobornyl and adamantanyl 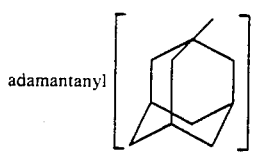

esters of methacrylic acid, preferably methyl methacrylate.

Examples of styrene derivatives are p-phenylstyrene, p-tert-butylstyrene, p-cyanostyrene, p-iodostyrene, α,β,β-trifluorostyrene, perfluorostyrene and 2,3,4,5,6-pentafluorostyrene. These styrene derivatives are easily copolymerized with the alkyl methacrylate to provide a relatively random copolymer, and the fiber prepared from the resulting copolymer as a core has thermal characteristics far better than the conventional fiber using either polymethyl methacrylate or polystyrene as a core. Other styrene derivatives such as α-methylstyrene and p-methylstyrene are not included within the scope of the present invention since α-methylstyrene does not easily enter into radical copolymerization with the alkyl methacrylate, and p-methylstyrene only provides a copolymer having poor thermal characteristics.

The most preferred copolymer used as a core is a methyl methacrylate/4-phenylstyrene copolymer and a methyl methacrylate/4-tert-butylstyrene copolymer.

All or part of the hydrogen atoms in the alkyl methacrylate and styrene derivative may be substituted with deuterium in order to improve the light transmittance in the wavelength of visible light and near infrared light regions as disclosed in U.S. Pat. No. 4,138,194. Such substitution can be achieved by the procedure as disclosed in, for example, Nagai et al., J. Polymer Sci., Vol. 62, 595-598 (1962).

The cladding of the plastic optical fiber of the present invention is produced from a copolymer of vinylidene fluoride and a perfluoroolefin. The cladding preferably has a melting point of at least 120° C. for obtaining satisfactory heat resistance; otherwise, upon exposure to a high temperature such as 100° to 120° C., it suffers from transmission loss that is increased to such a level that the fiber is no longer usable. The copolymer of vinylidene fluoride and perfluoroolefin preferably has a perfluoroolefin content of from 3 to 70 mol%. When the perfluoroolefin content is outside the above range, the resulting copolymer has so high a crystallinity that it suffers from a loss in characteristics other than thermal characteristics such as increased transmission loss and poor adhesion to the core.

Preferred examples of perfluoroolefins are tetrafluoroethylene, vinyl fluoride, hexafluoropropylene, octafluoroisobutylene and the like.

Examples of the copolymer of vinylidene fluoride and a perfluoroolefin include a copolymer of vinylidene fluoride and tetrafluoroethylene, a copolymer of vinylidene fluoride and vinyl fluoride, a copolymer of vinylidene fluoride and hexafluoropropylene and a copolymer of vinylidene fluoride and octafluoroisobutylene. Examples of the copolymer of vinylidene fluoride and tetrafluoroethylene include a copolymer having a vinylidene fluoride/tetrafluoroethylene molar ratio of 82/18 and a melting point of 120° C., a copolymer having a comonomeric molar ratio of 85/15 and a melting point of 120° C., a copolymer having a comonomeric molar ratio of 96/4 and a melting point of 145° C., and a copolymer having a comonomeric molar ratio of 70/30 and a melting point of 139° C. In addition, a terpolymer containing a small amount of vinyl acetate, methyl acrylate or styrene as a third comonomer can also be used.

The maximum content of the fluoroolefin in the copolymer of vinylidene fluoride and perfluoroolefin varies depending upon the type of copolymer, more specifically, the crystallinity, and the lower the crystallinity the higher the perfluoroolefin content. Accordingly, once the melting point range of a give copolymer is specified, the maximum content of the perfluoroolefin in this copolymer can be automatically determined. Generally, the melting point of the copolymer can be in the range of 120° C. to 160° C. and the maximum perfluoroolefin content in the copolymer can be selected in the range of 3 mol% to 70 mol% depending upon crystallinity of a specific copolymer in the above temperature range. For example, when a copolymer of vinylidene fluoride/tetrafluoroethylene is used, a copolymer with a tetrafluoroethylene content greater than about 60 mol% is not desirable since it is excessively crystalline and does not firmly adhere to the core.

Two typical methods of producing a plastic optical fiber useful herein are described in Japanese Patent Publication No. 42261/78 and U.S. Pat. No. 3,993,834. In the former method, pellets of a methyl methacrylate polymer are fed through a composite spinning spinneret to prepare a core. However, the pellets prepared in this method are contaminated by dust in the air, so the resulting optical fiber has a transmission loss as great as 1 to 2 dB/m. The latter method also uses a methyl methacrylate polymer as a core material, but instead of making pellets, the polymer is fed to a double-shaft bent extruder to remove volatiles before it is supplied to a spinneret. Therefore, the optical fiber produced by the latter method has better light transmission characteristics and its transmission loss is somewhere between 0.6 and 0.8 dB/m. The plastic optical fiber of the present invention could be produced by the method of Japanese Patent Publication No. 42261/78, but the use of a double-shaft bent extruder inevitably causes screw and cylinder wear and results in the entrance of foreign materials, and it is practically impossible to obtain a fiber having a transmission loss lower than 0.6 dB/m. For producing a plastic optical fiber having a transmission loss of only about 0.1 to 0.5 dB/m, it is preferred to prepare a preform and melt-spin it as in the fabrication of a quartz glass fiber.

A preform of the copolymer of an alkyl methacrylate and a styrene derivative used as the core material for the optical fiber of the present invention can be prepared by the following procedure: (1) the respective monomers are freed of impurities and polymerization inhibitor by a suitable purification technique such as distillation or recrystallization; (2) the purified monomers are mixed in a clean atmosphere free of dirt or dust; (3) the blend is charged in a closed or clean atmosphere together with a purified chain transfer agent and polymerization initiator and is subjected to thermal polymerization. Examples of chain transfer agents are mercaptans such as n-butyl mercaptan, lauryl mercaptan and ethylene bis(2-mercaptoacetate), chloroform, ethylbenzene and the like. Examples of polymerization initiators are azo initiators such as 2,2'-azobis-(isobutyronitrile) and 2,2'-azoisobutane, and peroxide initiators. These additives can be used in such an amount that the resulting copolymer has a degree of polymerization that is capable of spinning and mechanical properties of the spun fiber are not adversely affected by the presence of such additives. Such degree of polymerization can be in the range of from about 20 to about 1,000. The size of the preform varies depending upon the size of the specific polymerization vessel and the amount of the comonomers used, but one having a diameter between 10 and 30 mm and a length of from 200 to 1,000 mm is readily prepared. The volume of the preform decreases during the polymerization; to compensate for this volume reduction and to prepare a preform free of air bubbles that will cause light scattering, the polymerization vessel is preferably equipped with a piston that compresses the monomeric solution being polymerized to remove any free surface. Removing air dissolved in the monomer solution by freeze-degasification before polymerization is also effective to produce an optical fiber having low transmission loss.

The polymerization temperature can be selected from a range as is conventionally used in thermal polymerization, for example, temperatures higher than 60° C. can be used. However, the highest possible temperature is preferred since first of all, the polymerization period is short, and, secondly, the resulting copolymer has a uniform structure and composition and hence can yield a fiber having a low transmission loss. A temperature range of from 60° to 140° C. is particularly preferred. If the polymerization is started at a relatively low temperature, e.g., 60° to 80° C., the monomer solution is preferably heated in the final stage to a temperature higher than the glass transition point of the intended copolymer, i.e., at least 20° C. over the glass transition point, and the polymerization is completed at this temperature to prepare the desired preform. The final stage of the polymerization can be easily determined by conventional procedures such as, for example, by measuring a volume reduction of the polymerization mixture as determined by a shifted distance of a piston connected to the reaction vessel. The polymerization is generally completed in about 10 to about 20 hours.

Upon completion of the polymerization, the resulting copolymer preform is removed from the reaction vessel and stored in a desiccator to prevent dust pickup and water absorption. The preform can be drawn into a fiber by melt spinning which is well known in the art. An effective melt spinning can be achieved using a ram extruder comprising a cylinder and a piston; the preform is melted in the cylinder and fed to a spinning die in a predetermined amount by pushing it with the piston at a constant pressure or speed. Alternatively, the molten preform in the cylinder can be fed to the die in a given quantity by the pressure of an inert gas such as nitrogen gas.

The cladding can be formed on the core by a conventional melting method or solution method, as disclosed in, for example, U.S. Pat. No. 3,993,834 and Japanese Patent Publication No. 42260/78. In the former method, the vinylidene fluoride/tetrafluoroethylene copolymer is melted in a heated reservoir in a conventional inert gas atmosphere and fed to a spinning die in a given quantity through a gear pump, or the copolymer melted in a screw extruder is fed to the die. The molten streams of the core and cladding materials are combined in a concentric manner in the die and are extruded as a fiber having a core in the center and a cladding around it. The extruded fiber is drawn down at a constant rate which is usually two to three times as fast as the fiber is being extruded through the die. To draw down the fiber efficiently, the fiber coming from the die may be passed through a cooler in which air having a controlled temperature is caused to flow in a direction opposite to the draw-down direction.

In the solution method, the vinylidene fluoride/tetrafluoroethylene copolymer is dissolved in a solvent such as acetone or methyl ethyl ketone, and the solution is applied through a die onto the extruded core fiber, and the fiber is then dried to form an optical fiber having both a core and a cladding. If desired or necessary, the resulting fiber may be stretched to further improve its flexibility and bending properties. The cladding usually has a thickness of 5 to 20 μm.

By a method as described above, a plastic optical fiber having a core diameter of 0.2 to 3 mm can be easily produced. The core diameter is preferably in the range of 0.5 to 1.0 mm for achieving easy coupling of the fiber to a light source and for obtaining high fiber flexibility and bending properties. The core material used in the present invention is a copolymer of alkyl methacrylate and styrene derivative, but it is within the scope of the present invention to incorporate a third comonomer, preferably acrylic acid esters, most preferably methyl acrylate or ethyl acrylate, in the copolymer in an amount of less than about 10 mol%, preferably less than 3 mol%. It is also possible to incorporate a trace amount of a heat stabilizer in the core copolymer without greatly impairing the transmission characteristics of the fiber.

The present invention is now described in greater detail by reference to the following examples and comparative examples to which the scope of the invention is by no means limited.

EXAMPLE 1

Crude 4-phenylstyrene having a melting point of 119° to 120° C. which had been prepared by a conventional method was purified by recrystallization twice from anhydrous methanol on a clean bench to obtain purified 4-phenylstyrene.

Commerical methyl methacrylate of reagent quality (class 1) was also subjected to purification with 50 ml of the methyl methacrylate being washed twice with 100 ml of a 5% aqueous NaOH solution having 20 g of NaCl dissolved therein, and drying over anhydrous sodium sulfate, followed by distillation under vacuum.

The vessel in which the methyl methacrylate was subjected to purification was marked with a scale for measurement and was so instrumented that the monomer could be transferred to a mixing vessel under vacuum without contact with the atmosphere. The mixing vessel comprised a PTFE rotor as a stirrer, inlets for polymerization initiator and chain transfer agent, and an outlet with a PTFE stopper for transferring the mixture to a polymerization vessel.

17.7 g (0.098 mole) of the purified 4-phenylstyrene was weighed on a clean bench and charged into the mixing vessel. Then, 200 ml (1.872 moles) of the purified methyl methacrylate was also transferred to the mixing vessel where the mixture was stirred with a magnetic stirrer to form a monomer solution.

A polymerization initiator, 2,2-azobis(isobutyronitrile), which had been recrystallized twice from methanol was fed to the mixing vessel in an amount of 0.01 mol% based on the total moles of the monomers. A chain transfer agent, n-butyl mercaptan, which had been purified by distillation under vacuum, was added in an amount of 0.3 mol% based on the total moles of the monomers. The monomer solution was transferred from the mixing vessel to a polymerization vessel through a Teflon tube connected to the outlet of the mixing vessel to prevent contamination with dust or dirt. The polymerization vessel was a stainless steel cylinder (inside diameter: 25 mm) the inner wall of which was plated with hard chrome and the bottom of which was sealed with a PTFE plug. After the polymerization vessel was filled with the monomer solution, the Teflon tube was replaced by a piston that had a PTFE plug on its top end and which was attached to the top of the polymerization vessel.

The polymerization vessel was placed in a jacket heated at 80° C. and the piston as pressed with an air cylinder to hold the pressure in the vessel at 25 kg/cm$^2$. After holding the vessel at 80° C. for 14 hours, the temperature was elevated to 140° C. over a period of 3 hours and held at that temperature for 1 hour. The heating was stopped and the vessel was cooled under pressure. When the temperature became 80° C. or less, the pressure was reduced to atmospheric pressure and the vessel was taken out of the jacket and put on a clean bench where the piston and PTFE plug were removed from the vessel. The preform was taken out of the vessel and immediately put in a polyethylene bag with a zip-fastener. During this procedure great care was taken not to touch the preform with the hands. The preform in the polyethylene bag was stored in a dessicator. The preform thus obtained was transparent and free from air bubbles and optical unevenness.

The preform was fed into a ram extruder having a cylinder (ID: 26 mm, length: 600 mm) that was held at 250° C. in the outlet portion, 150° C. in the middle portion and 50° C. in the inlet portion. After 5 minutes of preheating, the ram was advanced at a constant rate (at about 15 mm/minute) while the outlet portion of the molten preform was fed into a spinneret heated at 230° C. A vinylidene fluoride/tetrafluoroethylene copolymer (m.p. 131° C., monomeric molar ratio: 88/12) was melted in a screw extruder having a cylinder that was held at 230° C. in the outlet portion, 180° C. in the middle portion and 100° C. in the inlet portion, and this material was fed to the spinneret. The spinneret was so constructed that a fiber having both a core and a cladding was produced. The fiber being extruded through the spinneret at a rate of about 8 cm$^3$/minute was drawn down at a rate of 40 m/min to produce a plastic optical fiber having an outside diameter of 0.5 mm and a cladding thickness of 20 μm. The resistance to heat shrinkage, flexibility and transmission loss of the fiber are shown in Table 1.

EXAMPLE 2

A plastic optical fiber was produced in the same manner as described in Example 1 except that the purified 4-phenylstyrene was used in an amount of 37.4 g (0.208 mole). The characteristics of the fiber obtained are shown in Table 1.

EXAMPLE 3

A plastic optical fiber was produced in the same manner as described in Example 1 except that the mixing vessel was fed with 74.9 g (0.468 mole) of 4-tert-butylstyrene having a boiling point of 79° to 81° C./7.5 mm Hg which had been prepared by a conventional method and which had been purified by vacuum distrillation and 150 ml (1.404 moles) of methyl methacrylate which had been purified as described in Example 1. After stirring the mixture, 2,2'-azobis(isobutyronitrile) and n-butyl-mercaptan were added in amounts of 0.01% and 0.3%, respectively, based on the total moles of the monomers used. The characteristics of the fiber obtained are also shown in Table 1.

EXAMPLE 4

A plastic optical fiber was produced in the same manner as described in Example 3 except that the purified 4-tert-butylstyrene and methyl methacrylate were used in amounts of 119.8 g (0.749 mole) and 80.0 ml (0.749 mole), respectively. The characteristics of the fiber obtained are shown in Table 1.

COMPARATIVE EXAMPLE 1

A plastic optical fiber was produced in the same manner as described in Example 1 except that the core was produced from a homopolymer prepared by polymerization of 200 ml (1.872 moles) of methyl methacrylate only and the cladding was produced from a vinylidene fluoride/tetrafluoroethylene copolymer having a monomeric molar ratio of 77/23. The characteristics of the fiber obtained are shown in Table 2.

COMPARATIVE EXAMPLE 2

A plastic optical fiber was produced in the same manner as described in Comparative Example 1 except that the cladding was produced from a vinylidene fluoride/tetrafluoroethylene copolymer having a monomeric molar ratio of 88/12. The characteristics of the fiber obtained are shown in Table 2.

COMPARATIVE EXAMPLE 3

A polymerization vessel as used in Example 1 was fed with a monomer solution prepared from a mixture of 200 g (1.25 moles) of 4-tert-butylstyrene (core material), $1.25 \times 10^{-4}$ moles (0.01 mol%) of 2,2'-azobis-(isobutyronitrile) (polymerization initiator) and $1.25 \times 10^{-3}$ moles (0.1 mol%) of n-butyl mercaptan (chain transfer agent). The monomer solution was pressurized at 25 kg/cm$^2$ using the system of Example 1 and maintained at 140° C. for 5 hours. The temperature was then elevated up to 140° C. over a period of 1 hour and the solution was maintained at 140° C. for 5 hours. The solution was then allowed to cool to at or below 80° C., and the pressure was reduced to atmospheric pressure to obtain a preform.

A plastic optical fiber was prepared from the preform thus obtained in the same manner as described in Example 1 except that the temperature of the outlet portion of the cylinder in the ram extruder was heated at 230° C. Some of the characteristics of the fiber thus obtained are shown in Table 2. The fiber was not flexible enough to withstand practical use.

COMPARATIVE EXAMPLE 4

A plastic opticl fiber was produced in the same manner as described in Example 1 except that the cladding was prepared from a vinylidene fluoride/tetrafluoroethylene copolymer having a melting point of 150° C. and a monomeric molar ratio of 98/2. Some of the characteristics of the fiber thus obtained are shown in Table 2. The cladding became turbid due to crystallization and the fiber having good light transmission could not be obtained.

TABLE 1

| | Example 1 | Example 2 | Example 3 | Example 4 |
|---|---|---|---|---|
| Core Copolymer | | | | |
| Ratio of monomers (mol %) | | | | |
| Methyl methacrylate | 95 | 90 | 75 | 50 |
| 4-Phenylstyrene | 5 | 10 | — | — |
| 4-tert-Butylstyrene | — | — | 25 | 50 |
| Cladding Copolymer | | | | |
| Ratio of monomers (mol %) | | | | |
| Vinylidene fluoride | 88 | 88 | 88 | 88 |
| Tetrafluoroethylene | 12 | 12 | 12 | 12 |
| Melting point of cladding material (°C.) | 131 | 131 | 131 | 131 |
| Fiber Characteristics | | | | |
| Outer diameter (mm) | 0.5 | 0.5 | 0.5 | 0.5 |
| Flexibility Diameter (mm) of mandrel around which the fiber could be wound without breaking | 1 | 1 | 1 | 3 |
| Transmission loss (dB/m)*² | | | | |
| 25° C. | 0.39 | 0.42 | 0.36 | 0.38 |
| 120° C. | 0.89 | 0.72 | 0.91 | 0.69 |
| Resistance to heat shrinkage*¹ (percent retention %) | | | | |
| 100° C. × 10 min | 99 | 100 | 100 | 100 |
| 110° C. × 10 min | 95 | 100 | 99 | 100 |
| 120° C. × 10 min | 93 | 97 | 94 | 99 |

TABLE 2

| | Comparative Example 1 | Comparative Example 2 | Comparative Example 3 | Comparative Example 4 |
|---|---|---|---|---|
| Core Copolymer | | | | |
| Ratio of monomers (mol %) | | | | |
| Methyl methacrylate | 100 | 100 | — | 95 |
| 4-tert-Butylstyrene | — | — | 100 | 5 |
| Cladding Copolymer | | | | |
| Ratio of monomers (mol %) | | | | |
| Vinylidene fluoride | 77 | 88 | 88 | 98 |
| Tetrafluoroethylene | 23 | 12 | 12 | 2 |
| Melting point of cladding material (°C.) | 110 | 131 | 131 | 150 (white turbid in cladding) |
| Fiber Characteristics | | | | |
| Outer diameter (mm) | 0.5 | 0.5 | 0.5 | 0.5 |
| Flexibility Diameter (mm) of mandrel around which the fiber could be wound without breaking | 1 | 1 | 30 | 1 |
| Transmission loss (dB/M)*² | | | | |
| 25° C. | 0.32 | 0.33 | 0.39 | — |
| 120° C. | No light transmitted | No light transmitted | — | — |
| Resistance to heat shrinkage*¹ (percent retention %) | | | | |
| 100° C. × 10 min | 96 | 97 | — | — |
| 110° C. × 10 min | 85 | 85 | — | — |
| 120° C. × 10 min | 70 | 73 | — | — |

*¹A sample fiber 10 cm long was put in a glass test tube and heated at a predetermined temperature for a predetermined time. The percent retention was determined by the following formula:

$$\frac{\text{Fiber length after heating}}{\text{initial fiber length}} \times 100$$

The average of five samples was calculated.

*²Fiber samples 5 to 10 m long were coupled with a He—Ne laser and the amount of incident and outgoing light was measured with a photo-power meter as the surface of the receiving end of each fiber was cut and polished. The average of the samples tested was calculated. The transmission loss L was determined by the following formula:

$$L = \frac{10}{l} \log \frac{I}{I_0}$$

wherein l = the fiber length, Io = the amount of incident light and I = the amount of outgoing light. The transmission loss at 120° C. was measured as follows: The transmission loss was measured at room temperature while heating a middle portion (3.5 m long) of a fiber sample (5 m long) at a constant temperature (120° C.) in a thermostat bath, with both the transmitting and receiving ends of the fiber (each 75 cm long) being outside the bath.

While the invention has been described in detail and with reference to specific embodiments thereof, it will be apparent to one skilled in the art that various changes and modifications can be made therein without departing from the spirit and scope thereof.

What is claimed is:

1. A plastic optical fiber comprising a core of a copolymer of an alkyl methacrylate and a styrene derivative, wherein said styrene derivative is selected from the group consisting of p-phenylstyrene, p-tert-butylstyrene, p-cyanostyrene, p-iodostyrene, a,b,b-trifluorostyrene, perfluorostyrene and 2,3,4,5,6-pentafluorostyrene, and a cladding of a copolymer of vinylidene fluoride and a perfluoroolefin provided on said core, the polymer of said cladding having a melting point of at least 120° C. and perfluoroolefin content in the range of from 3 mol% to 70 mol%.

2. A plastic optical fiber according to claim 1, wherein said alkyl methacrylate is represented by the formula

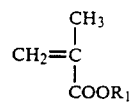

wherein $R_1$ represents an alkyl group having 1 to 10 carbon atoms.

3. A plastic optical fiber according to claim 2, wherein said alkyl group is a methyl, ethyl, propyl, butyl, isobornyl or adamantanyl group, 4. A plastic optical fiber according to claim 2, wherein said alkyl methacrylate is methyl methacrylate.

5. A plastic optical fiber according to claim 1, wherein said copolymer of alkyl mthacrylate and styrene derivative is produced at a monomer feed ratio of 3 to 80 mol% of styrene derivative.

6. A plastic optical fiber according to claim 1, wherein said perfluoroolefin is tetrafluoroethylene, vinyl fluoride, hexafluoropropylene or octafluoroisobutylene.

7. A plastic optical fiber according to claim 6 wherein the perfluoroolefin is tetrafluoroethylene.

8. A plastic optical fiber according to claim 7, wherein the tetrafluoroethylene content in the copolymer of vinylidene fluoride and tetrafluoroethylene is from 3 to 60 mol%.

9. A plastic optical fiber according to claim 5, wherein said monomer feed ratio is 5 to 60% of styrene derivative.

* * * * *